US012695167B2

(12) United States Patent
Qiao et al.

(10) Patent No.: US 12,695,167 B2
(45) Date of Patent: Jul. 28, 2026

(54) DIELECTRIC FILTER UNIT AND DIELECTRIC FILTER

(71) Applicant: ZTE CORPORATION, Shenzhen (CN)

(72) Inventors: Long Qiao, Shenzhen (CN); Wei Bu, Shenzhen (CN); Hongwei Gong, Shenzhen (CN); Zengqiang Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 114 days.

(21) Appl. No.: 18/693,628

(22) PCT Filed: Aug. 15, 2022

(86) PCT No.: PCT/CN2022/112564
§ 371 (c)(1),
(2) Date: Mar. 20, 2024

(87) PCT Pub. No.: WO2023/045621
PCT Pub. Date: Mar. 30, 2023

(65) Prior Publication Data

US 2025/0141077 A1 May 1, 2025

(30) Foreign Application Priority Data

Sep. 26, 2021 (CN) .......................... 202111130983.7

(51) Int. Cl.
*H01P 1/208* (2006.01)

(52) U.S. Cl.
CPC .................................. *H01P 1/2086* (2013.01)

(58) Field of Classification Search
CPC ............................... H01P 1/208; H01P 1/2086
See application file for complete search history.

(56) References Cited

U.S. PATENT DOCUMENTS 10,950,918 B1 * 3/2021 Wu ....................... H01P 1/2002
2020/0403287 A1 12/2020 Cui et al.
(Continued)

FOREIGN PATENT DOCUMENTS

CN 110336104 A 10/2019
CN 110400992 A 11/2019
(Continued)

OTHER PUBLICATIONS

Japan Patent Office. Notice of Reasons for Refusal for JP Application No. 2024-517563 and English translation, mailed Feb. 4, 2025, pp. 1-9.

(Continued)

*Primary Examiner* — Andrea Lindgren Baltzell
*Assistant Examiner* — Kimberly E Glenn
(74) *Attorney, Agent, or Firm* — Vivacqua Crane, PLLC

(57) ABSTRACT

Disclosed is a dielectric filter unit and a dielectric filter, where the dielectric filter unit includes a first dielectric resonant cavity and a second dielectric resonant cavity. The first dielectric resonant cavity is provided with a first frequency hole in an upper end face or a lower end face of the first dielectric resonant cavity, and the second dielectric resonant cavity is connected to the first dielectric resonant cavity and provided with a second frequency hole in an upper end face or a lower end face of the second dielectric resonant cavity. A coupling slot is provided at a joint of the first dielectric resonant cavity and the second dielectric resonant cavity, and a third frequency hole is provided at the joint of the first dielectric resonant cavity and the second dielectric resonant cavity.

20 Claims, 7 Drawing Sheets

(56) References Cited

U.S. PATENT DOCUMENTS

| | | | |
|---|---|---|---|
| 2021/0280954 | A1 | 9/2021 | Chun |
| 2024/0222831 | A1 | 7/2024 | Park et al. |

FOREIGN PATENT DOCUMENTS

| | | | | | |
|---|---|---|---|---|---|
| CN | 210379367 | U | | 4/2020 | |
| CN | 111384482 | A | | 7/2020 | |
| CN | 111384551 | A | | 7/2020 | |
| CN | 111740193 | A | | 10/2020 | |
| CN | 111799535 | A | * | 10/2020 | ................ H01P 7/10 |
| CN | 112397856 | A | | 2/2021 | |
| CN | 213752987 | U | | 7/2021 | |
| CN | 213845459 | U | * | 7/2021 | ............ H01P 1/2056 |
| CN | 113871826 | A | | 12/2021 | |
| JP | 2001068903 | A | | 3/2001 | |
| WO | 2015068493 | A1 | | 5/2015 | |
| WO | 2020145590 | A1 | | 7/2020 | |
| WO | 2021135621 | A1 | | 7/2021 | |
| WO | 2021135644 | A1 | | 7/2021 | |

OTHER PUBLICATIONS

Korean Intellectual Property Office. First Office Action for KR Application No. 10-2024-7012943 and English translation, mailed Dec. 17, 2024, pp. 1-14.

European Patent Office. Extended European Search Report for EP Application No. 22871679.1, mailed Dec. 16, 2024, pp. 1-8.

International Searching Authority. International Search Report and Written Opinion for PCT Application No. PCT/CN2022/112564 and English translation, mailed Oct. 26, 2022, pp. 1-11.

The State Intellectual Property Office of People's Republic of China. First Office Action for CN Application No. 202111130983.7 and English translation, mailed Mar. 1, 2022, pp. 1-12.

The State Intellectual Property Office of People's Republic of China. First Search Report for CN Application No. 202111130983.7 and English translation, mailed Feb. 22, 2022, pp. 1-6.

The State Intellectual Property Office of People's Republic of China. Second Office Action for CN Application No. 202111130983.7 and English translation, mailed Aug. 1, 2022, pp. 1-7.

The State Intellectual Property Office of People's Republic of China. Supplementary Search Report for CN Application No. 202111130983.7 and English translation, mailed Jul. 25, 2022, pp. 1-5.

Du, Z., et al. "A Novel Capacitive Cross-Coupling Structure for Ceramic-Filled Cavity Filters," IEEE Access, vol. 9, 2021, pp. 27201-27209.

Intellectual Property India. Examination Report for IN Application No. 202417031447 and English translation, mailed Nov. 13, 2025, pp. 1-6.

Sandhu, M., et al. "Miniaturized dielectric waveguide filters," International Journal of Electronics, 2016, pp. 1-12.

* cited by examiner

DIELECTRIC FILTER UNIT AND DIELECTRIC FILTER

CROSS-REFERENCE TO RELATED APPLICATIONS

This application is a national stage filing under 35 U.S.C. § 371 of international application number PCT/CN2022/112564, filed Aug. 15, 2022, which claims priority to Chinese patent application No. 202111130983.7, filed Sep. 26, 2021. The contents of these applications are incorporated herein by reference in their entirety.

TECHNICAL FIELD

The present disclosure relates to the field of communication devices, and in particular to a dielectric filter unit and a dielectric filter.

BACKGROUND

When electromagnetic waves propagate in materials with high dielectric constants, their wavelengths can be shortened. Utilizing this theory, dielectric materials can be used instead of traditional metallic materials, allowing for a reduction in the volume of filters while maintaining the same performance criteria. Research on dielectric filters has always been a hot topic in the communication industry. As a crucial component of wireless communication products, dielectric filters have particular significance in the miniaturization of communication devices.

Dielectric filters are typically consisting of multiple resonant cavities. The more resonant cavities there are, the higher the filter order, resulting in better suppression performance. However, this often leads to larger filter sizes. Currently, conventional dielectric filters struggle to balance the requirements of size, multiple resonance modes, and suppression performance, among other factors.

SUMMARY

The present disclosure aims to solve at least one of the technical problems in the existing art by providing a dielectric filter unit and a dielectric filter.

In accordance with a first aspect of the present disclosure, in an embodiment provided is a dielectric filter unit. The dielectric filter unit includes a first dielectric resonant cavity and a second dielectric resonant cavity.

The first dielectric resonant cavity is provided with a first frequency hole in an upper end face or a lower end face of the first dielectric resonant cavity. The second dielectric resonant cavity is connected to the first dielectric resonant cavity, and provided with a second frequency hole in an upper end face or a lower end face of the second dielectric resonant cavity.

The dielectric filter unit further includes a coupling slot provided at a joint of the first dielectric resonant cavity and the second dielectric resonant cavity, and a third frequency hole provided at the joint of the first dielectric resonant cavity and the second dielectric resonant cavity.

In accordance with a second aspect of the present disclosure, in an embodiment provided is a dielectric filter including two or more dielectric filter units as described in the above embodiment of the first aspect.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

The present disclosure will be further elaborated hereinafter with reference to the accompanying drawings and embodiments.

DETAILED DESCRIPTION

Figure 1:
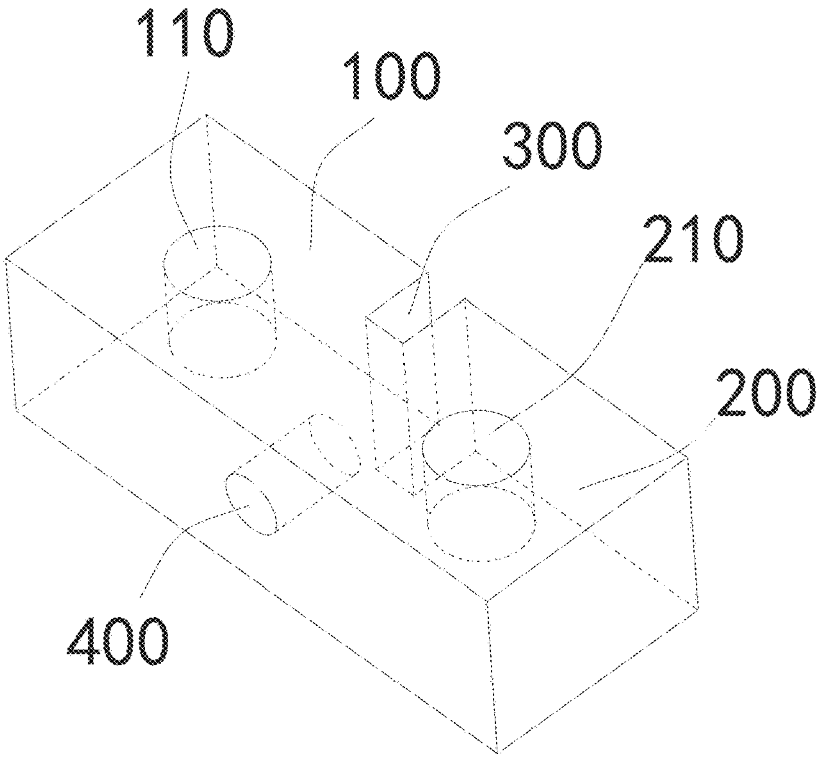
FIG. 1 is a perspective view of a dielectric filter unit according to a first embodiment of the present disclosure.

In this section, some specific embodiments of the present disclosure will be described in detail, and some preferable embodiments of the present disclosure are shown in the accompanying drawings. The accompanying drawings are used to supplement the text description of the specification with graphic illustrations, so that each technical feature and the overall technical scheme of the present disclosure can be intuitively and vividly understood. However, the accompanying drawings should not be construed as limiting the scope of protection application the present disclosure.

In the description of the present disclosure, the meaning of "several" is one or a plurality; the meaning of "a plurality of" is two or more; "greater than", "less than", "more than", etc. are to be construed as excluding a given figure; and "above", "below", "within", etc. are to be construed as including a given figure. If "first" and "second", etc. are referred to, it is only for the purpose of distinguishing technical features, and shall not be construed as indicating or implying relative importance or implying the number of the indicated technical features or implying the sequence of the indicated technical features.

In the description of the present disclosure, unless otherwise explicitly defined, the terms such as “arrange”, “install”, and “connect” should be construed in a broad sense, and those skilled in the art can determine the specific meanings of the above terms in the present disclosure in a rational way in conjunction with the specific contents of the technical schemes.

When electromagnetic waves propagate in materials with high dielectric constants, their wavelengths can be shortened. Utilizing this theory, dielectric materials can be used instead of traditional metallic materials, allowing for a reduction in the volume of filters while maintaining the same performance criteria. Research on dielectric filters has always been a hot topic in the communication industry. As a crucial component of wireless communication products, dielectric filters have particular significance in the miniaturization of communication devices.

The significance of cross-coupling lies in the fact that electromagnetic waves undergo a phase polarity inversion after passing through different coupling paths, thereby generating infinitesimal notch points, known as transmission zeros, outside the passband of the filter. Therefore, the out-of-band suppression capability of the filter can be improved without increasing the number of resonant cavities.

The out-of-band zeros are generated on both sides or one side at the high and low ends of the working passband of the filter. When the out-of-band zeros are located on both sides of the passband and have different magnitudes, they are at different distances from the center frequency of the passband. The above characteristics require the design to be flexible and adjustable according to specific out-of-band suppression requirements.

Dielectric filters typically consist of multiple resonant cavities. The more resonant cavities there are, the higher the filter order, resulting in better suppression performance. However, this often leads to larger filter sizes. Currently, conventional dielectric filters struggle to balance the requirements of size, multiple resonance modes, and suppression performance, among other factors.

Embodiments of the present disclosure provide dielectric filter units and dielectric filters that can simultaneously achieve small volumes, multiple resonance modes, and the generation of out-of-band transmission zero points.

The embodiments of the present disclosure will be further explained below with reference to the accompanying drawings.

Figure 2:
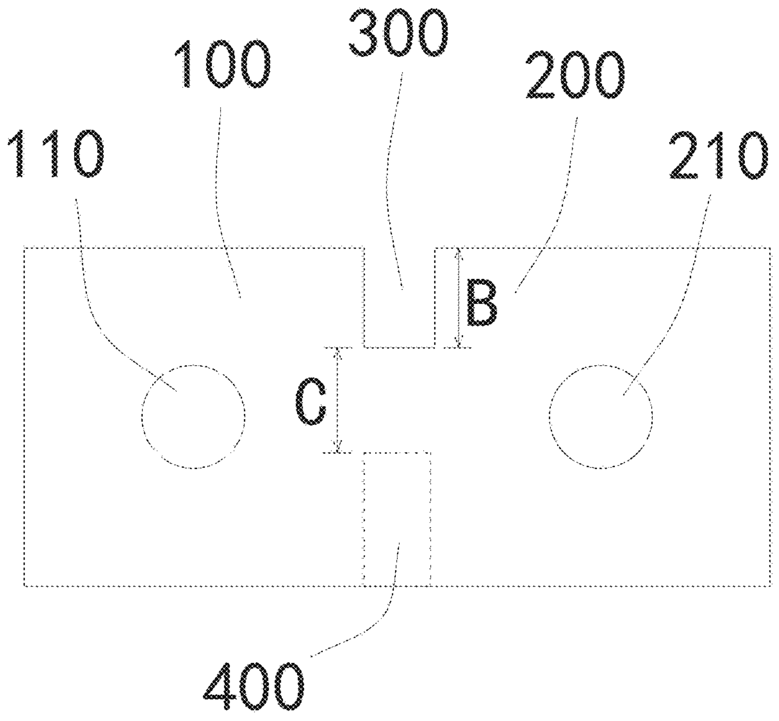
FIG. 2 is a top view of the dielectric filter unit according to the first embodiment of the present disclosure.
Figure 3:
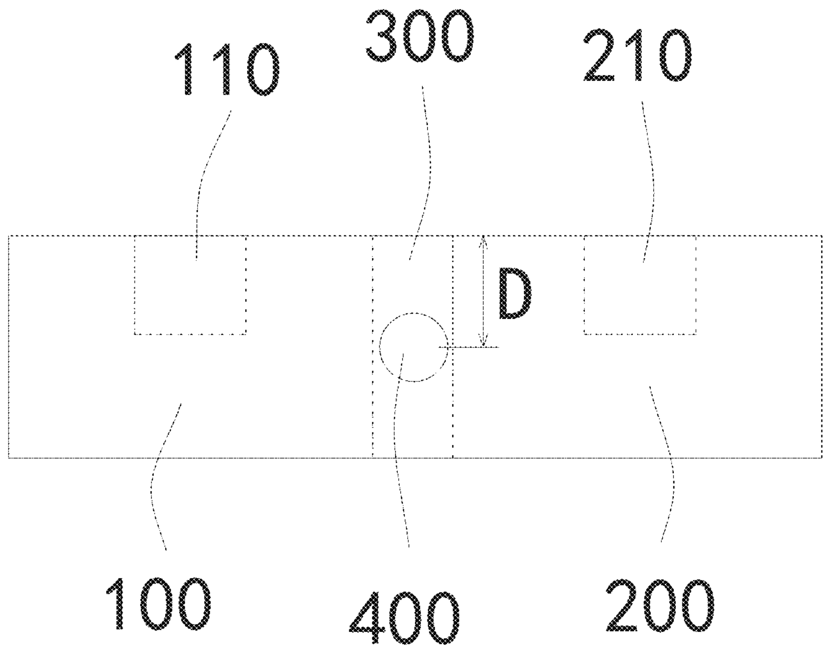
FIG. 3 is a front view of the dielectric filter unit according to the first embodiment of the present disclosure.

Referring to FIGS. 1 to 3, where FIG. 1 is a perspective view of a dielectric filter unit according to an embodiment of a first aspect of the present disclosure, FIG. 2 is a top view of the dielectric filter unit according to the embodiment of the present disclosure, and FIG. 3 is a front view of the dielectric filter unit according to the embodiment of the present disclosure. The dielectric filter unit according to the embodiment of the present disclosure includes a first dielectric resonant cavity 100 and a second dielectric resonant cavity 200.

The first dielectric resonant cavity 100 is provided with a first frequency hole 110 in an upper end face or a lower end face of the first dielectric resonant cavity 100.

The second dielectric resonant cavity 200 is connected to the first dielectric resonant cavity 100. The second dielectric resonant cavity 200 is provided with a second frequency hole 210 in an upper end face or a lower end face of the second dielectric resonant cavity 200. A coupling slot 300 is provided at a joint of the first dielectric resonant cavity 100 and the second dielectric resonant cavity 200. A third frequency hole 400 is further provided at the joint of the first dielectric resonant cavity 100 and the second dielectric resonant cavity 200.

The dielectric filter unit includes the first dielectric resonant cavity 100 and the second dielectric resonant cavity 200, and the coupling slot 300 is arranged between the first dielectric resonant cavity 100 and the second dielectric resonant cavity 200, such that a certain amount of coupling between the two resonant cavities is enabled. Further, the third frequency hole 400 is arranged at the joint of the first dielectric resonant cavity 100 and the second dielectric resonant cavity 200, and configured to cooperate with the coupling slot 300, thereby enabling a third resonance mode within the dual-cavity structure. This configuration enables the dielectric filter to achieve three transmission modes by using the physical form and volume dimensions of only two cavities, thus achieving the performance of a third-order filter, and also enables generation of out-of-band transmission zeros, providing high adjustability and producibility.

It can be seen that in the embodiment shown in FIGS. 1 to 3, the third frequency hole 400 has an opening facing a side face of the dielectric filter unit. It can be understood that the opening of the third frequency hole 400 may also be oriented toward an upper end face or a lower end face of the dielectric filter unit, and may also be oriented toward the joint of the upper end face and the side face of the dielectric filter unit or toward the joint of the side face and the lower end face of the dielectric filter unit. The opening of the third frequency hole 400 can be oriented towards different positions as long as it is ensured that the third frequency hole 400 can cooperate with the coupling slot 300 to enable the third resonance mode with the dual-cavity structure.

It should be noted that the first dielectric resonant cavity 100 and the second dielectric resonant cavity 200 may have various shapes, for example, a polygonal shape or an irregular cuboid shape. Both the first dielectric resonant cavity 100 and the second dielectric resonant cavity 200 in this embodiment are designed as rectangular cuboids.

As shown in FIG. 1, the first frequency hole 110 is a blind frequency hole formed by an inward recess of an upper end face of the first dielectric resonant cavity 100. Similarly, the second frequency hole 210 is a blind frequency hole formed by an inward recess of an upper end face of the second dielectric resonant cavity 200. The coupling slot 300 is provided between the first dielectric resonant cavity 100 and the second dielectric resonant cavity 200. The coupling slot 300 is configured to create a coupling window that allows for a certain level of coupling between the two resonant cavities. In addition, the third frequency hole 400 is formed by an inward recess of the side face of the dielectric filter unit, and the third frequency hole 400 is located between the two cavities. The entire outer surface of the dielectric filter unit, including the surfaces containing holes and slots, is a metallized. The metallization can be removed from local areas during adjustment.

The first frequency hole 110 and the second frequency hole 210 are located in the same end face of the dielectric filter unit, for example, both are located in the upper end face or the lower end face of the dielectric filter unit. As in the embodiment shown in FIGS. 1 to 3, both the first frequency hole 110 and the second frequency hole 210 are located in the upper end face of the dielectric filter unit, that is, the first frequency hole 110 is located in the upper end face of the first dielectric resonant cavity 100, and the second frequency hole 210 is located in the upper end face of the second dielectric resonant cavity 200. Both the first frequency hole 110 and the second frequency hole 210 are blind holes formed by inward recesses of the surfaces for generating and tuning the frequency of the resonant cavity.

Figure 4:
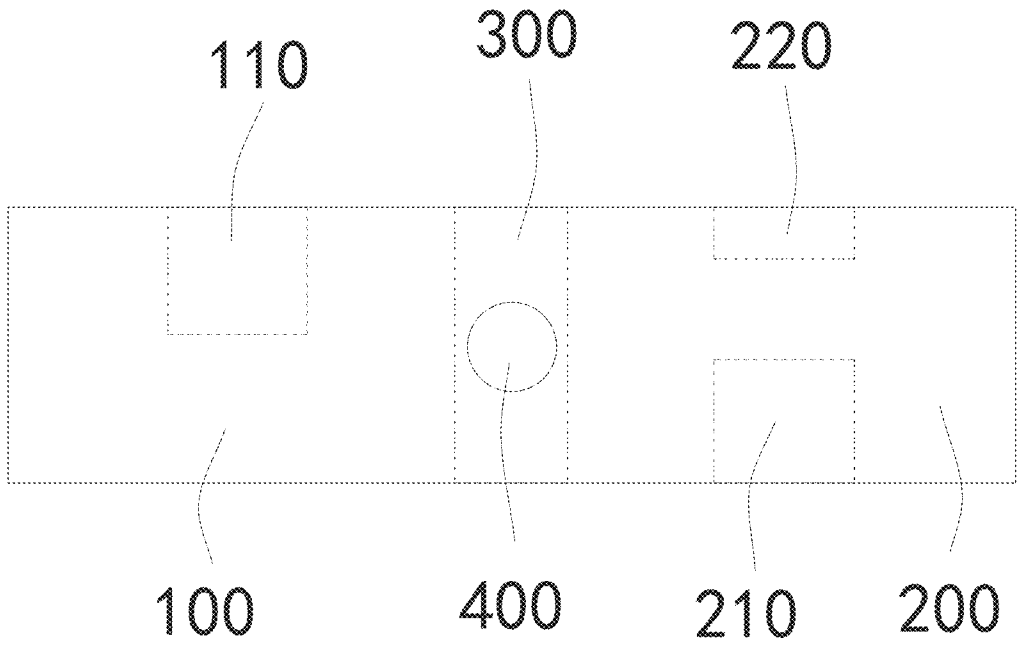
FIG. 4 is a front view of a dielectric filter unit according to a second embodiment of the present disclosure.

It can be understood that the first frequency hole 110 and the second frequency hole 210 may also be located in different end faces of the dielectric filter unit, i.e., the first frequency hole 110 and the second frequency hole 210 may be respectively located in the upper end face and the lower end face of the dielectric filter unit. For example, referring to FIG. 4, the first frequency hole 110 is located in the upper end face of the first dielectric resonant cavity 100, and the second frequency hole 210 is located in the lower end face of the second dielectric resonant cavity 200. The purpose of such a configuration is to achieve a transmission phase inversion, thereby causing the transmission zero to switch between the upper and lower ends of the passband of the filter.

In addition, when the first frequency hole 110 and the second frequency hole 210 are located in different end faces of the dielectric filter unit, the dielectric filter unit may also be provided with a fourth frequency hole. The fourth frequency hole is located in another end face of the first dielectric resonant cavity opposite to the end face in which the first frequency hole is located or in another end face of the second dielectric resonant cavity opposite to the end face in which the second frequency hole is located. In the embodiment shown in FIG. 4, the second dielectric resonant cavity 200 is further provided with a fourth frequency hole 220 in the upper end face of the second dielectric resonant cavity 200. The addition of the fourth frequency hole 220 can improve the convenience of adjustment.

The first frequency hole 110, the second frequency hole 210, and the fourth frequency hole 220 are all blind holes with a cross-sectional shape that may be circular, rectangular, regular polygonal, or irregular polygonal.

Figure 5:
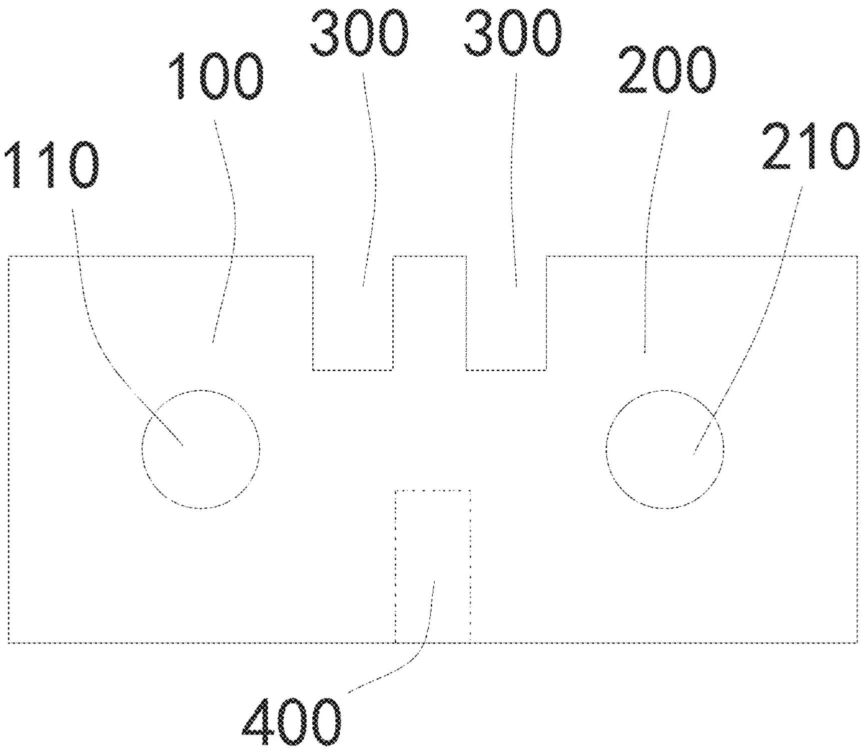
FIG. 5 is a top view of a dielectric filter unit according to a third embodiment of the present disclosure.

It should be noted that the coupling slot 300 is located in a region between the two dielectric resonant cavities, and the coupling slot 300 may be a through slot extending from the upper end face to the lower end face of the dielectric filter unit or a non-through blind slot. In addition, the number of coupling slots 300 in the dielectric filter unit may be only one or more than one. In the embodiment shown in FIGS. 1-3, one coupling slot 300 is provided. In the embodiment shown in FIG. 5, two coupling slots 300 are provided.

Figure 6:
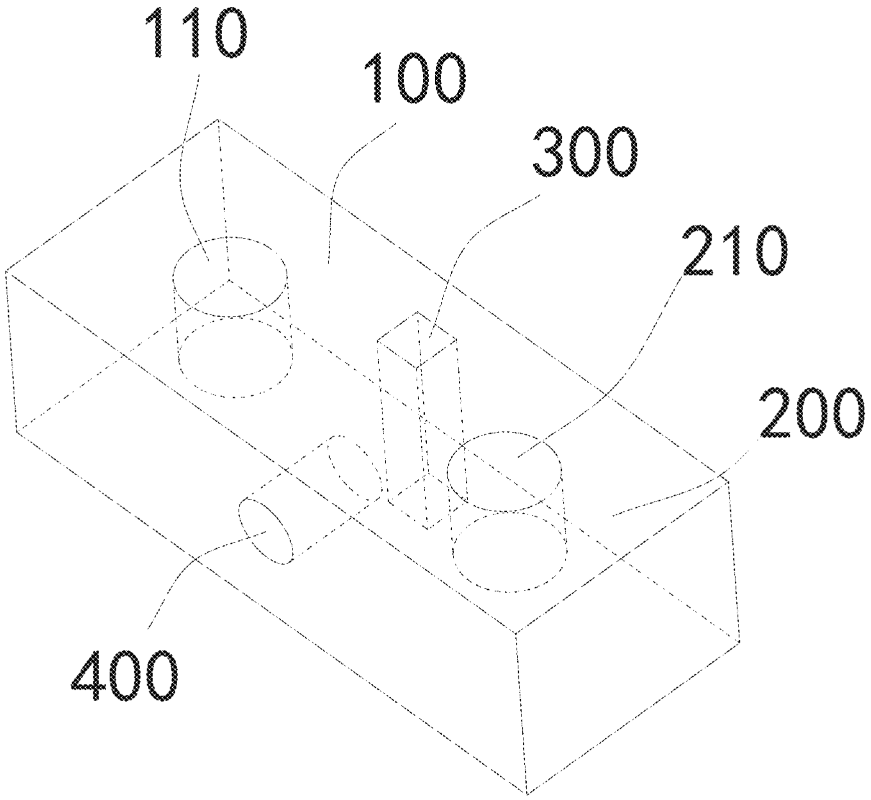
FIG. 6 is a perspective view of a dielectric filter unit according to a fourth embodiment of the present disclosure.

In addition, the coupling slot 300 may be formed by recessing from a surface of the dielectric filter unit or may be completely embedded in the dielectric filter unit. The embodiment shown in FIG. 6 illustrates the arrangement where the coupling slot 300 is embedded within the dielectric filter unit, i.e., the coupling slot 300 is located inside the joint of the first dielectric resonant cavity 100 and the second dielectric resonant cavity 200. Alternatively, the embodiment shown in FIG. 1 illustrates the arrangement where the coupling slot 300 is formed by recessing from a surface of the dielectric filter unit, i.e., the coupling slot 300 is located at the edge of the joint of the first dielectric resonant cavity 100 and the second dielectric resonant cavity 200. Herein, the cross-sectional shape of the coupling slot 300 may be circular, rectangular, regular polygonal, or irregular polygonal.

Figure 7:
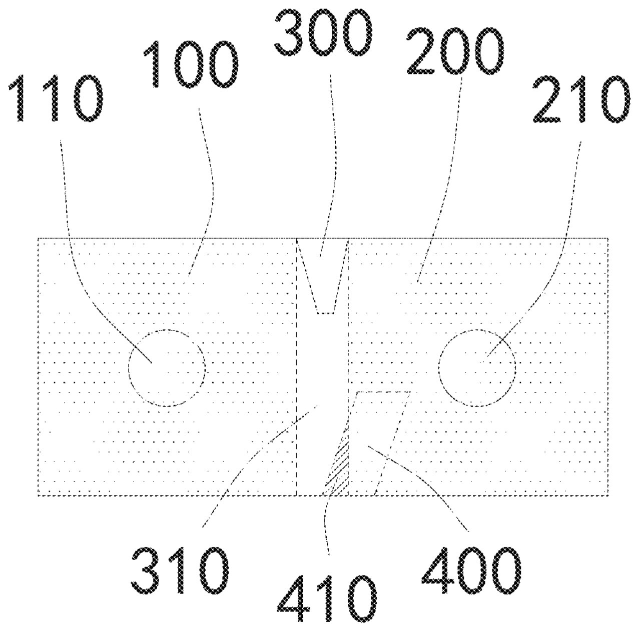
FIG. 7 is a top view of a dielectric filter unit according to a fifth embodiment of the present disclosure.
Figure 8:
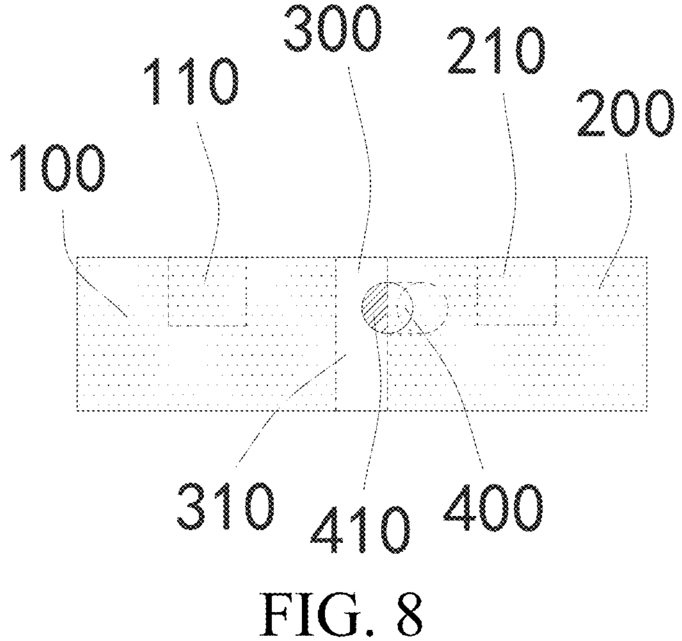
FIG. 8 is a front view of the dielectric filter unit according to the fifth embodiment of the present disclosure.

Referring to FIGS. 1 and 6, the third frequency hole 400 is a blind hole formed by inwardly recessing from a side face of the dielectric filter unit. The third frequency hole 400 may have a circular, rectangular, regular polygonal, or irregular polygonal cross-sectional shape. It can be understood that the third frequency hole 400 may have an axis perpendicular to the side face of the dielectric filter unit or perpendicular to the side face of the dielectric filter unit. When the axis of the third frequency hole 400 is not perpendicular to the side face of the dielectric filter unit, the axis of the third frequency hole 400 forms an acute angle with the side face of the dielectric filter unit. FIGS. 7 and 8 are top and front views, respectively, of the dielectric filter unit in which the axis of the third frequency hole 400 is not perpendicular to the side face of the dielectric filter unit. It can be seen that the projection area of the third frequency hole 400 in the horizontal direction completely or partially overlaps with the projection area of the coupling slot 300 in the horizontal direction. Herein, the coupling window 310 in FIGS. 7 and 8 is a projection area of the coupling slot 300 on the dielectric filter unit in the horizontal direction, and the third frequency hole 400 is located on the coupling window 310, that is, the third frequency hole 400 has an overlapping area 410 with the coupling window 310 in whole or in part.

When the number of the coupling slots 300 is more than one, the coupling window 310 refers to the sum of the projection areas of all the coupling slots 300. Furthermore, when there is a non-overlapping area between projection areas of any two coupling slots 300, the coupling window 310 also includes the non-overlapping area between the projections.

It should be noted that the number of the third frequency holes 400 in the dielectric filter unit may be only one as shown in FIG. 1; or the number of the third frequency holes 400 in the dielectric filter unit may be more than one, i.e., two or more third frequency holes 400 are provided. It should be noted that when two or more third frequency holes 400 are provided, the projection area of each third frequency hole 400 in the horizontal direction completely overlaps or partially overlaps with the projection area of the coupling slot 300 in the horizontal direction.

Referring to FIG. 3, the third frequency hole 400 is located at a side position of the dielectric filter unit, and the distance between the center point of the cross section of the third frequency hole 400 and the upper end face of the dielectric filter unit is indicated by D in the figure. The transmission zero of the dielectric filter unit can be adjusted by varying the distance D. Referring to FIG. 2, where the depth of the coupling slot 300 in the horizontal direction is indicated by B, the position of the transmission zero of the dielectric filter unit can be flexibly adjusted by varying the depth B of the coupling slot 300. In addition, in FIG. 2 the distance between the bottom of the third frequency hole 400 and the coupling slot 300 is indicated by C, and the frequency of the third mode of the dielectric filter unit can be flexibly adjusted by varying the distance C.

It should be noted that the term "dielectric" in the context of the dielectric filter unit refers to a material with a certain dielectric constant, such as ceramics with a dielectric constant of 20, 40, 60, etc. It can be understood that the dielectric filter unit can be made of either a single material with a specific dielectric constant or a combination of materials with different dielectric constants.

Figure 9:
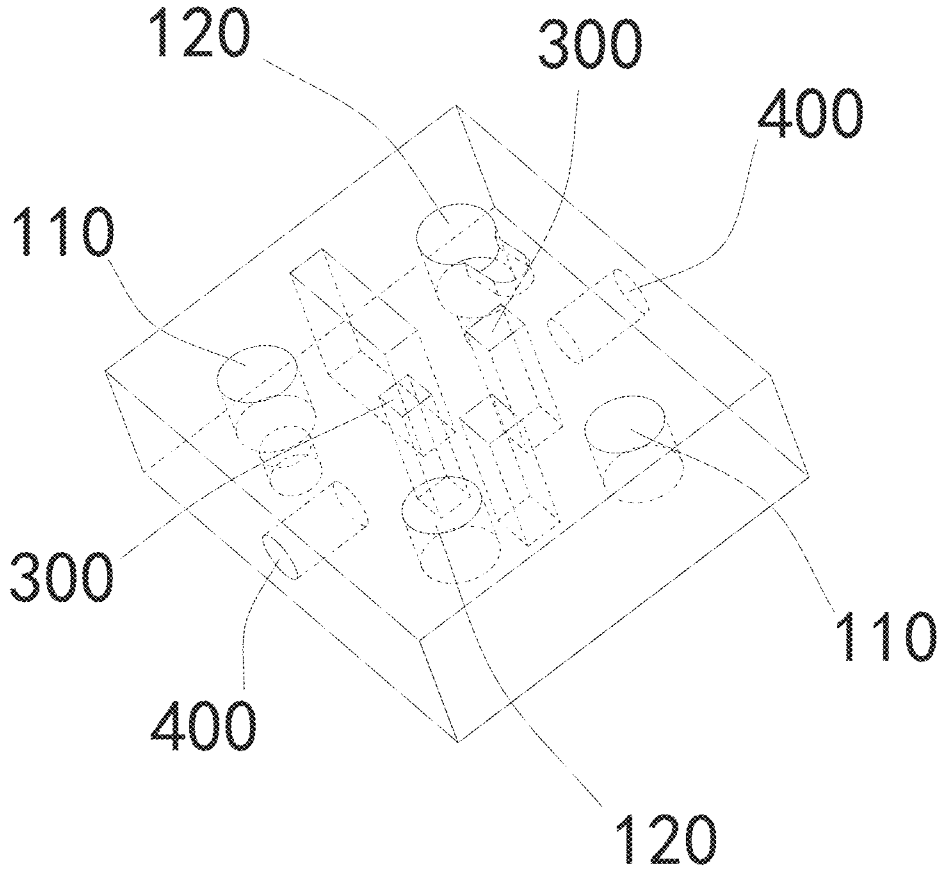
FIG. 9 is a perspective view of a dielectric filter according to an embodiment of the present disclosure.

In addition, in an embodiment of a second aspect of the present disclosure provided is a dielectric filter, including two or more dielectric filter units as described in the above embodiments of the first aspect. Now referring to FIG. 9, where provided is a design example of a dielectric filter including two above-described dielectric filter units according to the embodiment of the first aspect. It should be understood that this is only an example of how the dielectric filter unit of the present disclosure can be used to consist a dielectric filter. A plurality of instances of the dielectric filter unit can be cascaded to create filters with different orders, topologies, modes, and materials.

The transmission zero in a dielectric filter is generated by the superposition of signals with opposite phases from a cross-coupling path of non-adjacent cavities and a main coupling path, which causes the signal to be attenuated at specific frequencies outside the passband, resulting in the creation of a theoretical infinitesimal notch, known as the transmission zero.

Figure 11:
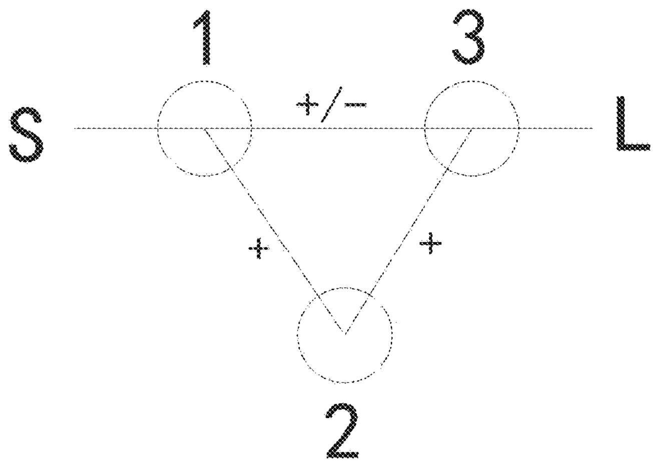
FIG. 11 is a schematic diagram of a typical CT three-pole structure composed of three cavities.
Figure 12:
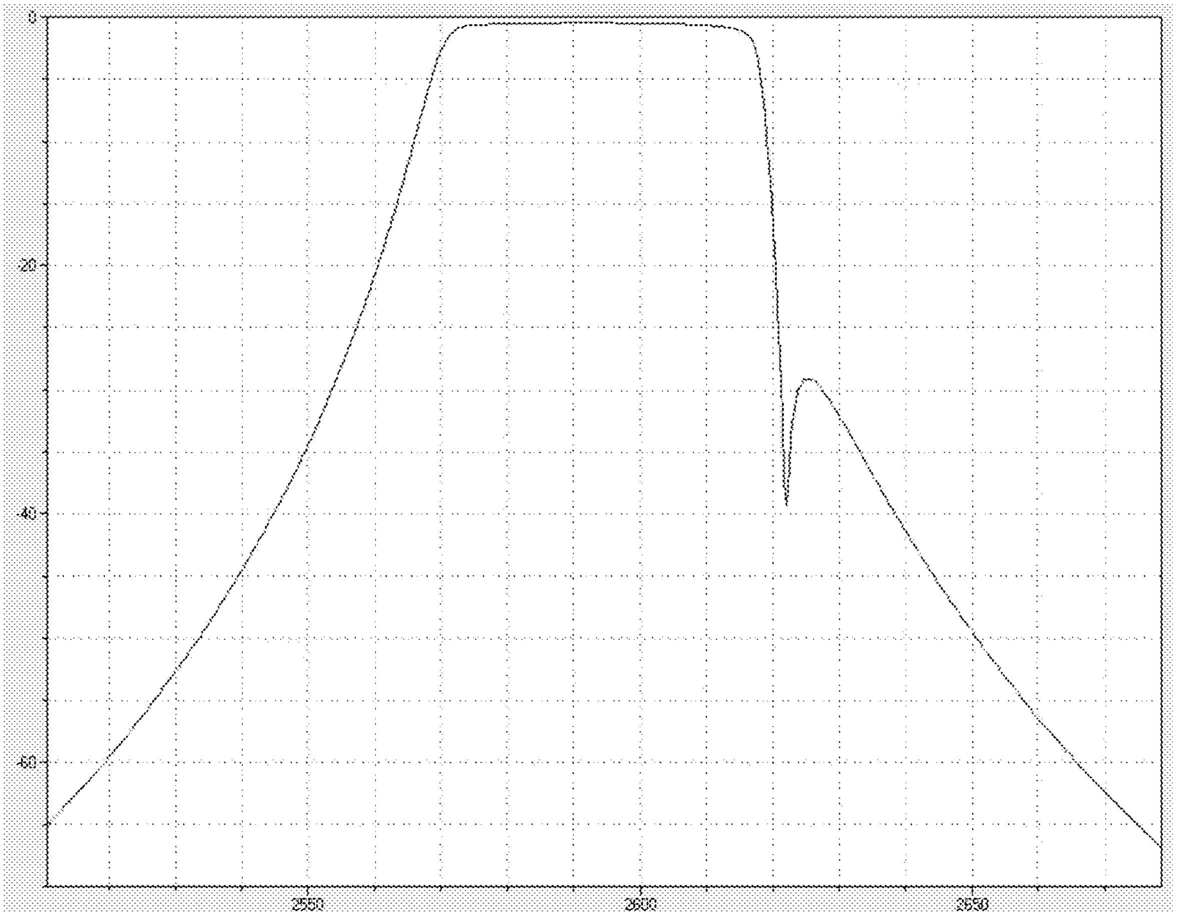
FIG. 12 is a schematic diagram showing that a transmission zero of a typical CT three-pole structure composed of three cavities falls at the high end of the passband.
Figure 13:
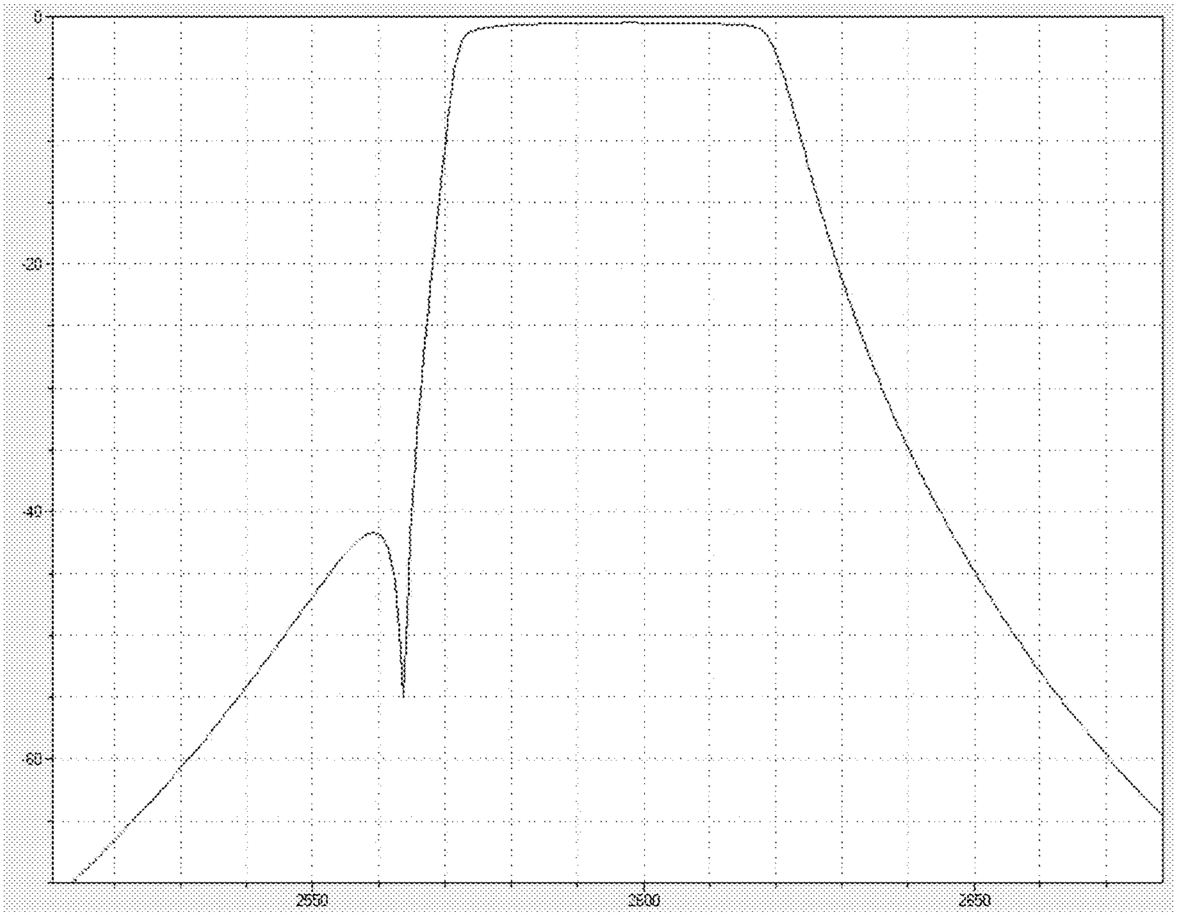
FIG. 13 is a schematic diagram showing that a transmission zero of a typical CT three-pole structure composed of three cavities falls at the low end of the passband.

Referring to FIG. 11, a typical CT three-pole structure consisting of three cavities is shown, and there are two signal transmission paths, which are 1→2→3 and 1→3, respectively. The opposite phases of the two paths are superimposed to produce a zero, where the sign "+" denotes positive coupling (inductive coupling) and the sign "−" denotes negative coupling (capacitive coupling). The positive coupling between signal transmission paths 1→3 determines that the filter transmission zero falls at the high end of the passband, as shown in FIG. 12; and the negative coupling between signal transmission paths 1→3 determines that the filter transmission zero falls at the low end of the passband, as shown in FIG. 13.

Figure 10:
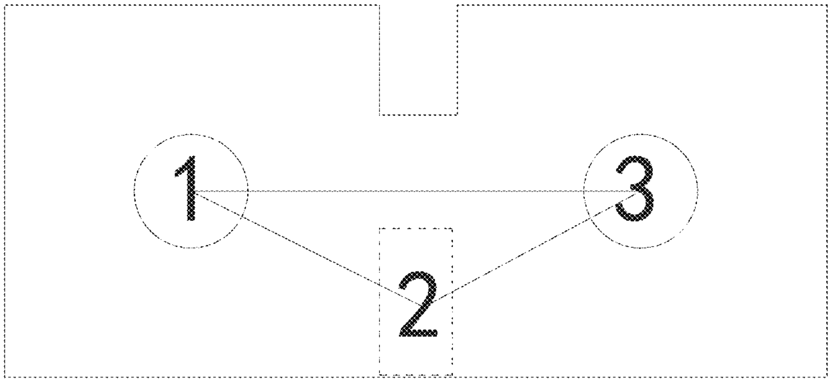
FIG. 10 is a schematic diagram showing the cooperation between a third frequency hole 400 and a coupling slot 300 of a dielectric filter unit according to an embodiment of the present disclosure.

Referring to FIG. 10, the third frequency hole 400 in the dielectric filter unit according to this embodiment can cooperate with the coupling slot 300 to enable a third operation mode, i.e., the mode indicated by 2 in the figure, in the dual-cavity structure. With the three modes in this specific structure, the CT three-pole coupling configuration shown in FIG. 11 above is completed.

With the dielectric filter unit provided by the embodiments of the present disclosure, the out-of-band suppression performance of the filter is increased by generating a third resonance mode, i.e., adding an additional resonant cavity, without increasing the volume; or the volume is significantly reduced while maintaining the same number of cavities. The dielectric filter unit generates a transmission zero, thereby further improving the out-of-band suppression performance in the filter transmission response. The third resonant mode of the dielectric filter unit can be independently adjustable, and the associated transmission zero is also independently adjustable, making it highly producible. The quality factor Q of the dielectric filter unit is not compromised by the generation of the third resonance mode. The dielectric filter unit is easy to process and form, and allows for lower material cost and lighter weight compared to filters of the same order.

The present disclosure includes the embodiments of dielectric filter units and dielectric filters. According to the schemes provided in the embodiments of the present disclosure, the dielectric filter unit includes a first dielectric resonant cavity and a second dielectric resonant cavity. The coupling slot is arranged between the first dielectric resonant cavity and the second dielectric resonant cavity such that a certain amount of coupling between the two resonant cavities is enabled. In addition, the third frequency hole is arranged at the joint of the first dielectric resonant cavity and the second dielectric resonant cavity, and configured to cooperate with the coupling slot, thereby enabling a third resonance mode within the dual-cavity structure. This configuration enables the dielectric filter to achieve three transmission modes using the physical form and volume dimensions of only two cavities, thus achieving the performance of a third-order filter, and also enables generation of out-of-band transmission zeros, providing high adjustability and producibility. The dielectric filter units and dielectric filters provided can simultaneously achieve small volumes, multiple resonance modes, and the generation of out-of-band transmission zero points.

Although the embodiments of the present disclosure have been described in detail above with reference to the accompanying drawings, the present disclosure is not limited to the above embodiments, and various changes may be made within the knowledge of those of ordinary skill in the art without departing from the purpose of the present disclosure.

What is claimed is:

1. A dielectric filter unit, comprising:

a first dielectric resonant cavity, provided with a first frequency hole in an upper end face or a lower end face of the first dielectric resonant cavity; and a second dielectric resonant cavity, connected to the first dielectric resonant cavity, and provided with a second frequency hole in an upper end face or a lower end face of the second dielectric resonant cavity;

wherein, a coupling slot is provided at a joint of the first dielectric resonant cavity and the second dielectric resonant cavity, and two or more third frequency holes are provided at the joint of the first dielectric resonant cavity and the second dielectric resonant cavity; and wherein each of the third frequency holes has a projection area in the horizontal direction completely or partially overlaps with a projection area of the coupling slot in the horizontal direction.

2. The dielectric filter unit of claim 1, wherein the third frequency hole has an opening facing an upper end face of the dielectric filter unit, a side face of the dielectric filter unit, a lower end face of the dielectric filter unit, a joint of the upper end face and the side face of the dielectric filter unit, or a joint of the side face and the lower end face of the dielectric filter unit.

3. The dielectric filter unit of claim 1, wherein the coupling slot is a through slot extending from an upper end face to a lower end face of the dielectric filter unit or a non-through blind slot.

4. The dielectric filter unit of claim 1, wherein the coupling slot is located inside the joint of the first dielectric resonant cavity and the second dielectric resonant cavity or at an edge of the joint of the first dielectric resonant cavity and the second dielectric resonant cavity.

5. The dielectric filter unit of claim 1, wherein two or more coupling slots are provided.

6. The dielectric filter unit of claim 1, wherein the first frequency hole and the second frequency hole are located in a same end face of the dielectric filter unit.

7. The dielectric filter unit of claim 1, wherein the first dielectric resonant cavity is provided with a fourth frequency hole in another end face of the first dielectric resonant cavity opposite to the end face in which the first frequency hole is located, or the second dielectric resonant cavity is provided with a fourth frequency hole in another end face of the second dielectric resonant cavity opposite to the end face in which the second frequency hole is located.

8. The dielectric filter unit of claim 1, wherein the first frequency hole, the second frequency hole and the third frequency hole are all blind holes.

9. The dielectric filter unit of claim 1, wherein the third frequency hole has an axis, perpendicular to or intersecting at an acute angle with, a side face of the dielectric filter unit.

10. The dielectric filter unit of claim 1, wherein the third frequency hole has a projection area in a horizontal direction completely or partially overlaps with a projection area of the coupling slot in the horizontal direction.

11. The dielectric filter unit of claim 1, wherein the first frequency hole, the second frequency hole, the third frequency hole and the coupling slot have a circular, rectangular, regular polygonal, or irregular polygonal cross section.

12. The dielectric filter unit of claim 1, wherein the first frequency hole and the second frequency hole are located in different end faces of the dielectric filter unit.

13. A dielectric filter, comprising two or more dielectric filter units, wherein each of the two or more dielectric units comprises:

a first dielectric resonant cavity, provided with a first frequency hole in an upper end face or a lower end face of the first dielectric resonant cavity; and a second dielectric resonant cavity, connected to the first dielectric resonant cavity, and provided with a second frequency hole in an upper end face or a lower end face of the second dielectric resonant cavity;

wherein, a coupling slot is provided at a joint of the first dielectric resonant cavity and the second dielectric resonant cavity, and two or more third frequency holes are provided at the joint of the first dielectric resonant cavity and the second dielectric resonant cavity; and wherein each of the third frequency holes has a projection area in the horizontal direction completely or partially overlaps with a projection area of the coupling slot in the horizontal direction.

14. The dielectric filter of claim 13, wherein the third frequency hole has an opening facing an upper end face of the dielectric filter unit, a side face of the dielectric filter unit, a lower end face of the dielectric filter unit, a joint of the upper end face and the side face of the dielectric filter unit, or a joint of the side face and the lower end face of the dielectric filter unit.

15. The dielectric filter of claim 13, wherein the coupling slot is a through slot extending from an upper end face to a lower end face of the dielectric filter unit or a non-through blind slot.

16. The dielectric filter of claim 13, wherein the coupling slot is located inside the joint of the first dielectric resonant cavity and the second dielectric resonant cavity or at an edge of the joint of the first dielectric resonant cavity and the second dielectric resonant cavity.

17. The dielectric filter of claim 13, wherein two or more coupling slots are provided.

18. The dielectric filter of claim 13, wherein the first frequency hole and the second frequency hole are located in a same end face of the dielectric filter unit.

19. The dielectric filter of claim 13, wherein the first frequency hole, the second frequency hole and the third frequency hole are all blind holes.

20. The dielectric filter of claim 13, wherein the first frequency hole and the second frequency hole are located in different end faces of the dielectric filter unit.

* * * * *